(12) United States Patent
Ganapathiappan et al.

(10) Patent No.: US 10,731,044 B2
(45) Date of Patent: Aug. 4, 2020

(54) 3-DIMENSIONAL PRINTING

(71) Applicant: Hewlett-Packard Development Company, L.P., Fort Collins, CO (US)

(72) Inventors: Sivapackia Ganapathiappan, Palo Alto, CA (US); Howard S. Tom, Palo Alto, CA (US); Lihua Zhao, Palo Alto, CA (US); Krzysztof Nauka, Palo Alto, CA (US); Yan Zhao, Palo Alto, CA (US); Hou T. Ng, Palo Alto, CA (US); Keshava A. Prasad, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 573 days.

(21) Appl. No.: 15/507,584

(22) PCT Filed: Sep. 26, 2014

(86) PCT No.: PCT/US2014/057882
§ 371 (c)(1),
(2) Date: Feb. 28, 2017

(87) PCT Pub. No.: WO2016/048380
PCT Pub. Date: Mar. 31, 2016

(65) Prior Publication Data
US 2017/0247553 A1 Aug. 31, 2017

(51) Int. Cl.
*C09D 11/037* (2014.01)
*C09D 11/50* (2014.01)
(Continued)

(52) U.S. Cl.
CPC .......... *C09D 11/037* (2013.01); *B29C 64/165* (2017.08); *B33Y 10/00* (2014.12);
(Continued)

(58) Field of Classification Search
CPC ... C09D 11/033; C09D 11/322; C09D 11/328; C09D 11/037; C09D 11/102;
(Continued)

(56) References Cited

U.S. PATENT DOCUMENTS 5,508,489 A 4/1996 Benda et al.
5,858,604 A 1/1999 Takeda et al.
(Continued)

FOREIGN PATENT DOCUMENTS

JP 2009220576 10/2009
JP 2013073054 4/2013
(Continued)

OTHER PUBLICATIONS

International Search Report dated Jun. 18, 2015 for PCT/US2014/057882, Applicant Hewlett-Packard Development Company, L.P.
(Continued)

*Primary Examiner* — Robert J Grun
(74) *Attorney, Agent, or Firm* — Thorpe, North & Western LLP

(57) ABSTRACT

The present disclosure is drawn to coalescent inks and material sets for 3D printing. The coalescent ink can include a water-soluble near-infrared dye having a peak absorption wavelength from 800 nm to 1400 nm. The coalescent ink can also contain water.

15 Claims, 3 Drawing Sheets

(51) Int. Cl.
  *B33Y 70/00* (2020.01)
  *C09D 11/033* (2014.01)
  *B29C 67/00* (2017.01)
  *B33Y 10/00* (2015.01)
  *C09D 11/328* (2014.01)
  *C09D 11/322* (2014.01)
  *B29C 64/165* (2017.01)

(52) U.S. Cl.
  CPC ............ *B33Y 70/00* (2014.12); *C09D 11/033* (2013.01); *C09D 11/322* (2013.01); *C09D 11/328* (2013.01); *C09D 11/50* (2013.01)

(58) Field of Classification Search
  CPC ....... B29C 64/165; B33Y 70/00; B33Y 10/00; B29K 2105/0032; B29K 2105/251
  See application file for complete search history.

(56) References Cited

U.S. PATENT DOCUMENTS

| | | |
|---|---|---|
| 6,159,657 A | 12/2000 | Fleming et al. |
| 6,410,202 B1 | 6/2002 | Fleming et al. |
| 6,632,584 B1 | 10/2003 | Morgan |
| 8,252,104 B2 | 8/2012 | Sadohara |
| 2002/0047259 A1 | 4/2002 | Lambert et al. |
| 2006/0134419 A1 | 6/2006 | Monsheimer et al. |
| 2006/0275698 A1 | 12/2006 | Nguyen et al. |
| 2007/0183918 A1 | 8/2007 | Monsheimer et al. |
| 2007/0238056 A1 | 10/2007 | Baumann et al. |
| 2008/0122141 A1 | 5/2008 | Bedal et al. |
| 2009/0236571 A1* | 9/2009 | Cohen .................. C07C 229/18 252/587 |
| 2009/0263744 A1 | 10/2009 | Kuroki |
| 2010/0068330 A1 | 3/2010 | Martinoni |
| 2011/0042653 A1 | 2/2011 | Glodde et al. |
| 2011/0070407 A1 | 3/2011 | Kato et al. |
| 2011/0244390 A1 | 10/2011 | Felder et al. |
| 2012/0092428 A1 | 4/2012 | Ganapathiappan et al. |
| 2012/0137929 A1 | 6/2012 | Nguyen et al. |
| 2013/0059089 A1 | 3/2013 | Gullentops et al. |

FOREIGN PATENT DOCUMENTS

| | | |
|---|---|---|
| JP | 2014115471 | 6/2014 |
| WO | 2013021173 | 2/2013 |

OTHER PUBLICATIONS

Jones et al., Use of infrared dyes for transmission laser welding of plastics, http://www.twi-global.com/technical-knowledge/published-papers/use-of-infrared-dyes-for . . . , accessed Aug. 22, 2014, 5 pages.

Kruth et al., Lasers and materials in selective laser sintering, Assembly Automation23.4, 2003, pp. 357-371.

Torgersen et al., In Vivo Writing using Two-Photon-Polymerization, Proceedings of LPM2010—The 11th International Symposium on Laser Precision Microfabrication, pp. 1-5.

\* cited by examiner

3-DIMENSIONAL PRINTING

BACKGROUND

Methods of 3-dimensional (3D) digital printing, a type of additive manufacturing, have continued to be developed over the last few decades. However, systems for 3D printing have historically been very expensive, though those expenses have been coming down to more affordable levels recently. In general, 3D printing technology improves the product development cycle by allowing rapid creation of prototype models for reviewing and testing. Unfortunately, the concept has been somewhat limited with respect to commercial production capabilities because the range of materials used in 3D printing is likewise limited. Nevertheless, several commercial sectors such as aviation and the medical industry have benefitted from the ability to rapidly prototype and customize parts for customers.

Various methods for 3D printing have been developed, including heat-assisted extrusion, selective laser sintering, photolithography, as well as others. In selective laser sintering, a powder bed is exposed to point heat from a laser to melt the powder wherever the object is to be formed. This method is very slow and can take more than eight hours to produce a simple part. The resulting part also lacks edge accuracy and smoothness. Additionally, this method does not produce colored objects very easily. It has also been an expensive method, with the system cost typically exceeding $200,000. Accordingly, development of new 3D printing technologies continues.

DETAILED DESCRIPTION

The present disclosure is drawn to the area of 3D printing. More specifically, the present disclosure provides near-infrared coalescent inks and material sets for printing 3D parts.

In light area processing (LAP), a thin layer of polymer powder is spread on a bed to form a powder bed. A printing head, such as an inkjet print head, is then used to print a coalescent ink over portions of the powder bed corresponding to a thin layer of the three dimensional object to be formed. Then the bed is exposed to a light source, e.g., typically the entire bed. The coalescent ink absorbs more energy from the light than the unprinted powder. The absorbed light energy is converted to thermal energy, causing the printed portions of the powder to melt and coalesce. This forms a solid layer. After the first layer is formed, a new thin layer of polymer powder is spread over the powder bed and the process is repeated to form additional layers until a complete 3D part is printed. In accordance with the present technology, this LAP process can achieve fast throughput with good accuracy.

To absorb and convert the light energy to thermal energy, near-infrared dyes can be used in the coalescent inks. These near-infrared dyes can absorb light wavelengths in the range of about 800 nm to 1400 nm and convert the absorbed light energy to thermal energy. When used with a light source that emits a wavelength in this range and a polymer powder that has a low absorbance in this range, the near-infrared dye causes the printed portions of the polymer powder to melt and coalesce without melting the remaining polymer powder. Thus, near-infrared dyes can be just as efficient or even more efficient at generating heat and coalescing the polymer powder when compared to carbon black (which is also effective at absorbing light energy and heating up the printed portions of the powder bed, but has the disadvantage of always providing black or gray parts in color).

According to the present technology, coalescent inks can be formulated with near-infrared dyes so that the near-infrared dye has substantially no impact on the apparent color of the ink. This allows the formulation of colorless coalescent inks that can be used to coalesce the polymer powder but which will not impart noticeably visible color to the polymer powder. Alternatively, the coalescent inks can include additional pigments and/or dyes to give the inks a color such as cyan, magenta, yellow, blue, green, orange, violet, black, etc. Such colored coalescent inks can be used to print colored 3D parts with acceptable optical density. The coalescent inks can also be formulated with near-infrared dyes that are stable in the ink vehicle and that provide good ink jetting performance. The near-infrared dyes can also be compatible with the polymer powder so that jetting the ink onto the polymer powder provides adequate coverage and interfiltration of the dyes into the powder.

Figure 1:
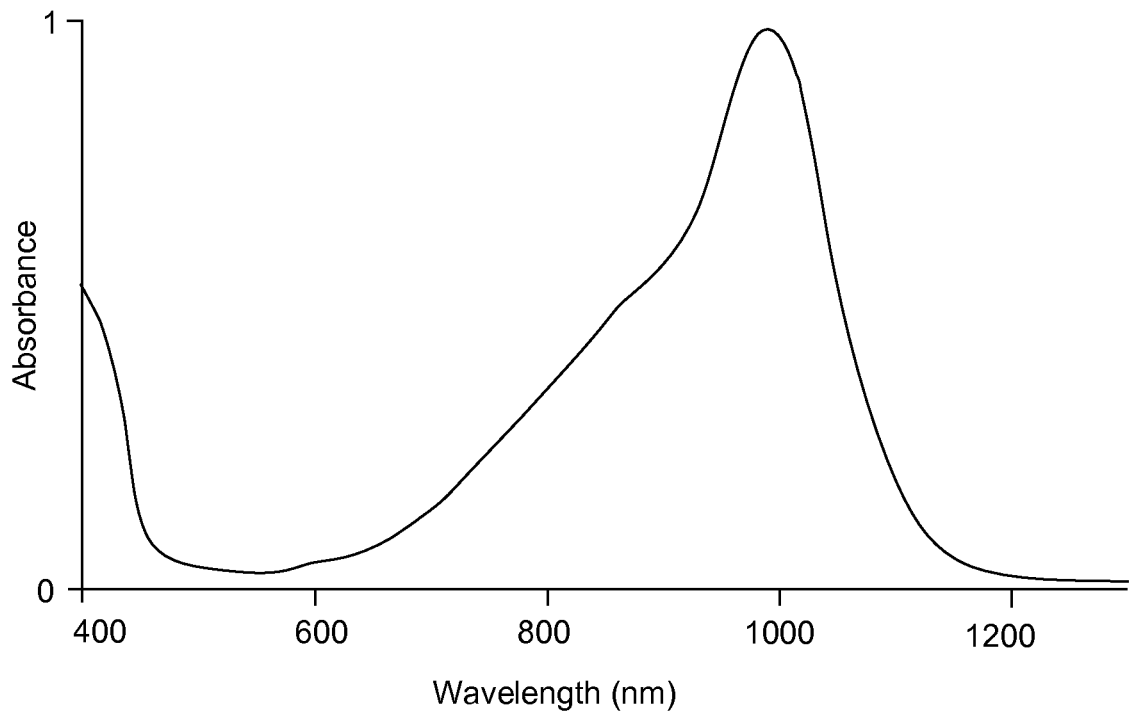
FIG. 1 illustrates absorption spectrum for a tertiary amine water soluble near-infrared dye in accordance with examples of the present disclosure.
Figure 2:
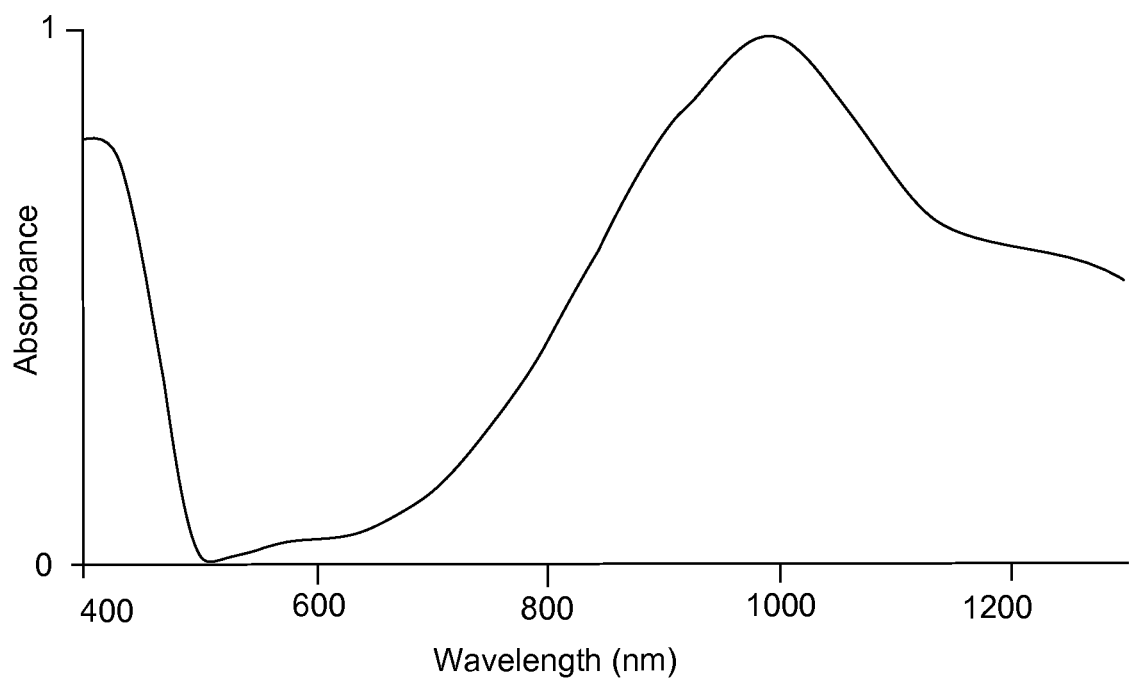
FIG. 2 illustrates an absorption spectrum for a tetraphenyldiamine water soluble near-infrared dye in accordance with examples of the present disclosure.
Figure 3:
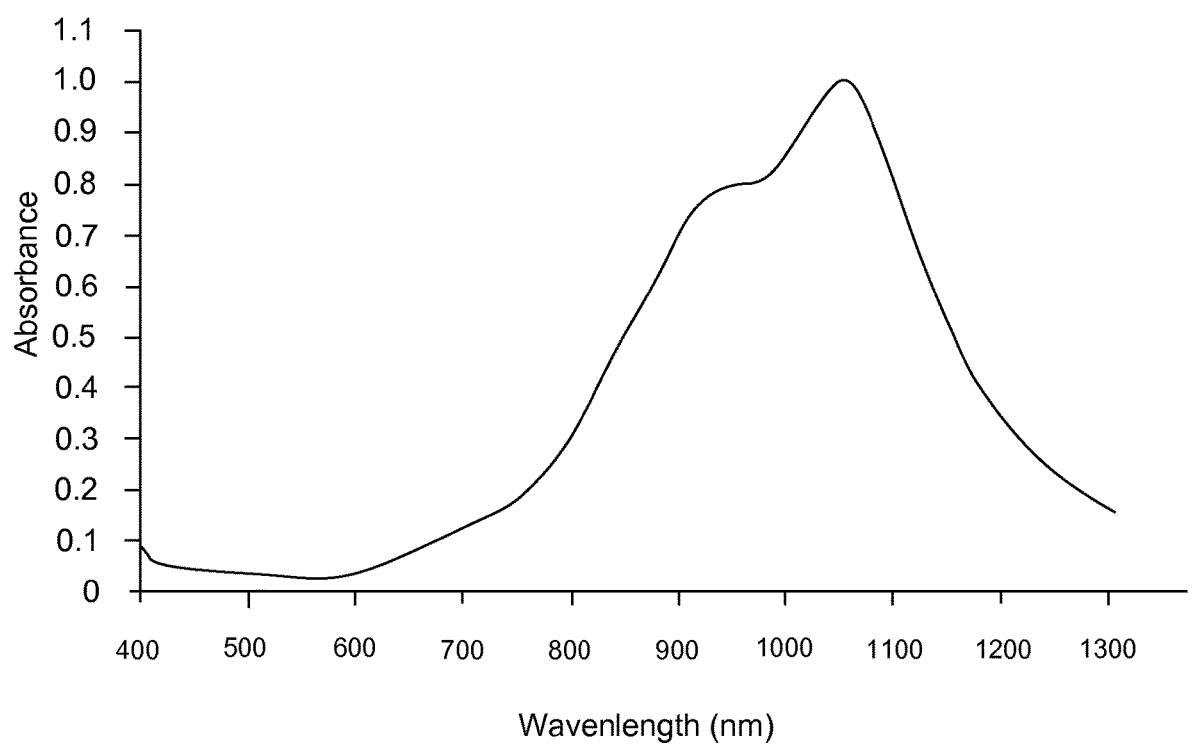
FIG. 3 illustrates an absorption spectrum for a tetraphenyldiamine water soluble near-infrared dye in accordance with examples of the present disclosure.

The near-infrared dye can therefore be selected based on its absorption spectrum, its solubility in the ink vehicle, and its compatibility with the polymer powder. FIGS. 1-3 show absorption spectra for three different near-infrared dyes. FIG. 1 is the absorption spectrum for a tertiary amine near-infrared dye and FIGS. 2-3 are absorption spectra for two different tetraphenyldiamine near-infrared dyes. Each of these dyes has very low absorbance in the visible light range, which is about 400 nm to 700 nm. However, each dye has a very high absorbance in the range of 800 nm to 1400 nm.

The near-infrared dye is of course not limited to the dyes illustrated in the figures or the dyes listed above. Other dyes can also be suitable. In one example, the coalescent ink can include a water-soluble near-infrared dye having a peak absorption wavelength from 800 nm to 1400 nm, wherein the near infrared dye is selected from the group consisting of aminium dyes, tetraaryldiamine dyes, cyanine dyes, dithiolene dyes, and combinations thereof. The coalescent ink can also include a colorant, e.g., a pigment that imparts a visible color to the coalescent ink and water.

In some examples, the concentration of near-infrared dye in the coalescent ink can be from 0.1 wt % to 25 wt %. In one example, the concentration of near-infrared dye in the coalescent ink can be from 0.1 wt % to 15 wt %. In another example, the concentration can be from 0.1 wt % to 10 wt %. In yet another example, the concentration can be from 0.5 wt % to 5 wt %.

The concentration can be adjusted to provide a coalescent ink in which the visible color of the coalescent ink is not substantially altered by the near-infrared dye. Although near-infrared dyes generally have very low absorbance in the visible light range, the absorbance is usually greater than zero. Therefore, the near-infrared dyes can typically absorb some visible light, but their color in the visible spectrum is minimal enough that it does not substantially impact the inks ability to take on another color when a colorant is added (unlike carbon black which dominates the inks color with gray or black tones). The pure dyes in powder form can have a visible color, such as light green, light brown or other colors depending on the absorption spectrum of the specific dye. Concentrated solutions of the dyes can also have a visible color. Accordingly, the concentration of the near-infrared dye in the coalescent ink can be adjusted so that the dye is not present in such a high amount that it alters the visible color of the coalescent ink. For example, a near-infrared dye with a very low absorbance of visible light wavelengths can be included in greater concentrations compared to a near-infrared dye with a relatively higher absorbance of visible light. These concentrations can be adjusted based on a specific application with some experimentation.

In further examples, the concentration of the near-infrared dye can be high enough that the near-infrared dye impacts the color of the coalescent ink, but low enough that when the ink is printed on a polymer powder, the near-infrared dye does not impact the color of the polymer powder. The concentration of the near-infrared dye can be balanced with the amount of coalescent ink that is to be printed on the polymer powder so that the total amount of dye that is printed onto the polymer powder is low enough that the visible color of the polymer powder is not impacted. In one example, the near-infrared dye can have a concentration in the coalescent ink such that after the coalescent ink is printed onto the polymer powder, the amount of near-infrared dye in the polymer powder is from 0.1 wt % to 1.5 wt % with respect to the weight of the polymer powder.

The near-infrared dye can have a temperature boosting capacity sufficient to increase the temperature of the polymer powder above the melting or softening point of the polymer powder. As used herein, "temperature boosting capacity" refers to the ability of a near-infrared dye to convert near-infrared light energy into thermal energy to increase the temperature of the printed polymer powder over and above the temperature of the unprinted portion of the polymer powder. Typically, the polymer powder particles can be fused together when the temperature increases to the melting or softening temperature of the polymer. As used herein, "melting point" refers to the temperature at which a polymer transitions from a crystalline phase to a pliable, amorphous phase. Some polymers do not have a melting point, but rather have a range of temperatures over which the polymers soften. This range can be segregated into a lower softening range, a middle softening range and an upper softening range. In the lower and middle softening ranges, the particles can coalesce to form a part while the remaining polymer powder remains loose. If the upper softening range is used, the whole powder bed can become a cake. The "softening point," as used herein, refers to the temperature at which the polymer particles coalesce while the remaining powder remains separate and loose. When the coalescent ink is printed on a portion of the polymer powder, the near-infrared dye can heat the printed portion to a temperature at or above the melting or softening point, while the unprinted portions of the polymer powder remain below the melting or softening point. This allows the formation of a solid 3D printed part, while the loose powder can be easily separated from the finished printed part.

Although melting point and softening point are often described herein as the temperatures for coalescing the polymer powder, in some cases the polymer particles can coalesce or be sintered together at temperatures slightly below the melting point or softening point. Therefore, as used herein "melting point" and "softening point" can include temperatures slightly lower, such as up to about 20° C. lower, than the actual melting point or softening point.

In one example, the near-infrared dye can have a temperature boosting capacity from about 10° C. to about 30° C. for a polymer with a melting or softening point from about 100° C. to about 350° C. If the powder bed is at a temperature within about 10° C. to about 30° C. of the melting or softening point, then such a near-infrared dye can boost the temperature of the printed powder up to the melting or softening point, while the unprinted powder remains at a lower temperature. In some examples, the powder bed can be preheated to a temperature from about 10° C. to about 30° C. lower than the melting or softening point of the polymer. The coalescent ink can then be printed onto the powder and the powder bed can be irradiated with a near-infrared light to coalesce the printed portion of the powder.

The coalescent ink can also include a pigment or dye colorant that imparts a visible color to the coalescent ink. In some examples, the colorant can be present in an amount from 0.5 wt % to 10 wt % in the coalescent ink. In one example, the colorant can be present in an amount from 1 wt % to 5 wt %. In another example, the colorant can be present in an amount from 5 wt % to 10 wt %. However, the colorant is optional and in some examples the coalescent ink can include no additional colorant. These coalescent inks can be used to print 3D parts that retain the natural color of the polymer powder. Additionally, coalescent ink can include a white pigment such as titanium dioxide that can also impart a white color to the final printed part. Other inorganic pigments such as alumina or zinc oxide can also be used.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be disperses with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal® Yellow 3G, Chromophtal® Yellow GR, Chromophtal® Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the coalescent in and/or ultimately, the printed part.

The colorant can be included in the coalescent ink to impart color to the printed object when the coalescent ink is jetted onto the powder bed. Optionally, a set of differently colored coalescing inks can be used to print multiple colors. For example, a set of coalescent inks including any combination of cyan, magenta, yellow (and/or any other colors), colorless, white, and/or black coalescent inks can be used to print objects in full color. Alternatively or additionally, a colorless coalescent ink can be used in conjunction with a set of colored, non-coalescent inks to impart color. In some examples, a colorless coalescent ink containing a near-infrared dye can be used to coalesce the polymer powder and a separate set of colored or black or white inks not containing the near-infrared dye can be used to impart color.

The components of the coalescent ink can be selected to give the ink good ink jetting performance and the ability to color the polymer powder with good optical density. Besides the near-infrared dye and the colorant, if present, the coalescent ink can include a liquid vehicle. Liquid vehicle formulations that can be used with the organic-soluble near-infrared dyes described herein can include water and one or more co-solvents present in total at from 1 wt % to 50 wt %, depending on the jetting architecture. Further, one or more non-ionic, cationic, and/or anionic surfactant can optionally be present, ranging from 0.01 wt % to 20 wt %. In one example, the surfactant can be present in an amount from 5 wt % to 20 wt %. The liquid vehicle can also include dispersants in an amount from 5 wt % to 20 wt %. The balance of the formulation can be purified water, or other vehicle components such as biocides, viscosity modifiers, materials for pH adjustment, sequestering agents, preservatives, and the like. In one example, the liquid vehicle can be predominantly water. Because the near-infrared dyes are soluble in water, an organic co-solvent is not necessary to solubilize the near-infrared dye. Therefore, in some examples the coalescing ink can be substantially free of organic solvent. However, in other examples a co-solvent can be used to help disperse other dyes or pigments, or improve the jetting properties of the ink.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

One or more surfactants can also be used, such as alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Consistent with the formulation of this disclosure, various other additives can be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R. T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, as well as other additives to modify properties of the ink as desired. Such additives can be present at from 0.01 wt % to 20 wt %.

In one example, the liquid vehicle can include the components and amounts as shown in Table 1:

TABLE 1

| Ingredients | Wt (%) |
| --- | --- |
| 2-Pyrrolidinone | 50-75 |
| 2-Methyl-1,3-Propanediol | 5-12 |
| Tetraethylene glycol | 5-12 |
| LEG-1 | 5-10 |

TABLE 1-continued

| Ingredients | Wt (%) |
| --- | --- |
| Surfynol ® CT151 surfactant from Air Products and Chemicals, Inc. | 0.2-1.2 |
| Zonyl ® FSO fluorosurfactant from DuPont | 0.01-1 |
| SMA1440H | 1-5 |
| Tris base | 0.1-1 |

In another example, the liquid vehicle can include the components and amounts as shown in Table 2:

TABLE 2

| Ink Components | Wt (%) |
| --- | --- |
| 2-Pyrrolidinone | 50-100 |
| Crodafos N3 ™ surfactant from Croda | 0.1-5 |

In yet another example, the liquid vehicle can include the components and amounts as shown in Table 3:

TABLE 3

| Component | Wt. % |
| --- | --- |
| 2-methyl-1,3-propanediol | 10-40 |
| Crodafos N3 ™ surfactant from Croda | 0.1-5 |
| Tergitol ™ 15-S-12 surfactant from Dow Chemical Company | 0.1-3 |
| Zonyl ® FSO-100 fluorosurfactant from DuPont | 0.5-5 |
| Proxel ™ GXL (20% as is) biocide from Lonza | 0.1-1 |

In still another example, the liquid vehicle can include the components and amounts as shown in Table 4:

TABLE 4

| Component | Wt. % |
| --- | --- |
| 2-Hydroxyethyl-2-Pyrrolidone | 5-20 |
| Dantocol ™ DHE bonding agent from Lonza | 30-80 |
| LEG | 1-20 |
| Crodafos N3 ™ surfactant from Croda | 1-20 |
| Surfynol ® SEF (75% as is) surfactant from Air Products and Chemicals, Inc. | 1-10 |
| Kordek ™ MLX (10% as is) biocide from Dow Chemical Company | 0.1-5 |
| Proxel ™ GXL (20% as is) biocide from Lonza | 0.1-5 |

In a further example, the liquid vehicle can include the components and amounts as shown in Table 5:

TABLE 5

| Ink vehicle components | Wt. % |
| --- | --- |
| Tripropylene glycol | 20-60 |
| 1-(2-Hydroxyethyl)-2-imidazolidinone | 20-40 |
| LEG-1 | 0.5-5 |
| Crodafos N3 ™ surfactant from Croda | 1-6 |
| Tergitol ™ 15-S-7 surfactant from Dow Chemical Company | 1-6 |
| Zonyl ® FSO fluorosurfactant from DuPont | 0.1-1.2 |
| Proxel ™ GXL biocide from Lonza | 0.1-1.2 |

It is noted the liquid vehicle formulations of Tables 1 to 5 are provided by example only and other formulations with similar properties can likewise be formulated in accordance with the present technology.

The present technology also includes material sets for 3D powder bed printing. A material set for 3D powder bed printing can include a coalescent ink containing a water-soluble near-infrared dye having a peak absorption wavelength from 800 nm to 1400 nm and water. The material set can also include a particulate polymer formulated to coalesce when contacted by the coalescent ink and irradiated by a near-infrared energy emitting the peak absorption wavelength. The coalescent ink can include any of the components described herein.

The particulate polymer can be a polymer powder. In one example, the polymer powder can have an average particle size from 10 to 100 microns. The particles can have a variety of shapes, such as substantially spherical particles or irregularly-shaped particles. In some examples, the polymer powder can be capable of being formed into 3D printed parts with a resolution of 10 to 100 microns. As used herein, "resolution" refers to the size of the smallest feature that can be formed on a 3D printed part. The polymer powder can form layers from about 10 to about 100 microns thick, allowing the coalesced layers of the printed part to have roughly the same thickness. This can provide a resolution in the z-axis direction of about 10 to about 100 microns. The polymer powder can also have a sufficiently small particle size and sufficiently regular particle shape to provide about 10 to about 100 micron resolution along the x-axis and y-axis.

In some examples, the particulate polymer can be colorless. For example, the particulate polymer can have a white, translucent, or transparent appearance. In combination with a coalescing ink having an invisible near-infrared dye and no additional colorant, this can provide a printed part that is white, translucent, or transparent. In other examples, the particulate polymer can be colored for producing colored parts. In still other examples, when the polymer powder is white, translucent, or transparent, color can be imparted to the part by the coalescent ink or other ink, as previously described.

The particulate polymer can have a melting or softening point from about 100° C. to about 350° C. In further examples, the polymer can have a melting or softening point from about 150° C. to about 200° C. A variety of thermoplastic polymers with melting points or softening points in these ranges can be used. For example, the particulate polymer can be selected from the group consisting of nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, and mixtures thereof. In a specific example, the particulate polymer can be nylon 12, which can have a melting point from about 175° C. to about 200° C. In another specific example, the particulate polymer can be thermoplastic polyurethane.

The particulate polymer and the near-infrared dye used in the coalescent ink can be selected to have compatible properties. For example, the near-infrared dye, when printed on a portion of the particulate polymer, can have a sufficient temperature boosting capacity so that the printed portion of the particulate polymer increases in temperature by at least 10° C. more than a non-printed portion of the particulate polymer when both the printed portion and the non-printed portion are irradiated with a wavelength of about 800 nm to about 1400 nm.

In some examples, the water-soluble near-infrared dye can be present in the coalescent ink at a relatively low concentration, so that the near-infrared dye is molecularly dispersed when the coalescent ink is printed onto the particulate polymer. The dye molecules can interfiltrate into the particulate polymer and passivate surfaces of the polymer particles. In one example, the liquid vehicle of the coalescent ink can evaporate after the ink is printed onto the polymer particles. This leaves behind the near-infrared dye molecules and other pigments and dyes, if present, on the surfaces of the polymer particles. Because coalescence of the polymer particles depends strongly on melting or softening of the surfaces of the particles, the dye molecules at the surfaces can provide efficient coalescence of the particles. Because the dye molecules are water-soluble, the dye molecules can easily be removed from the surface of the finished part by washing the part with water.

Figure 4:
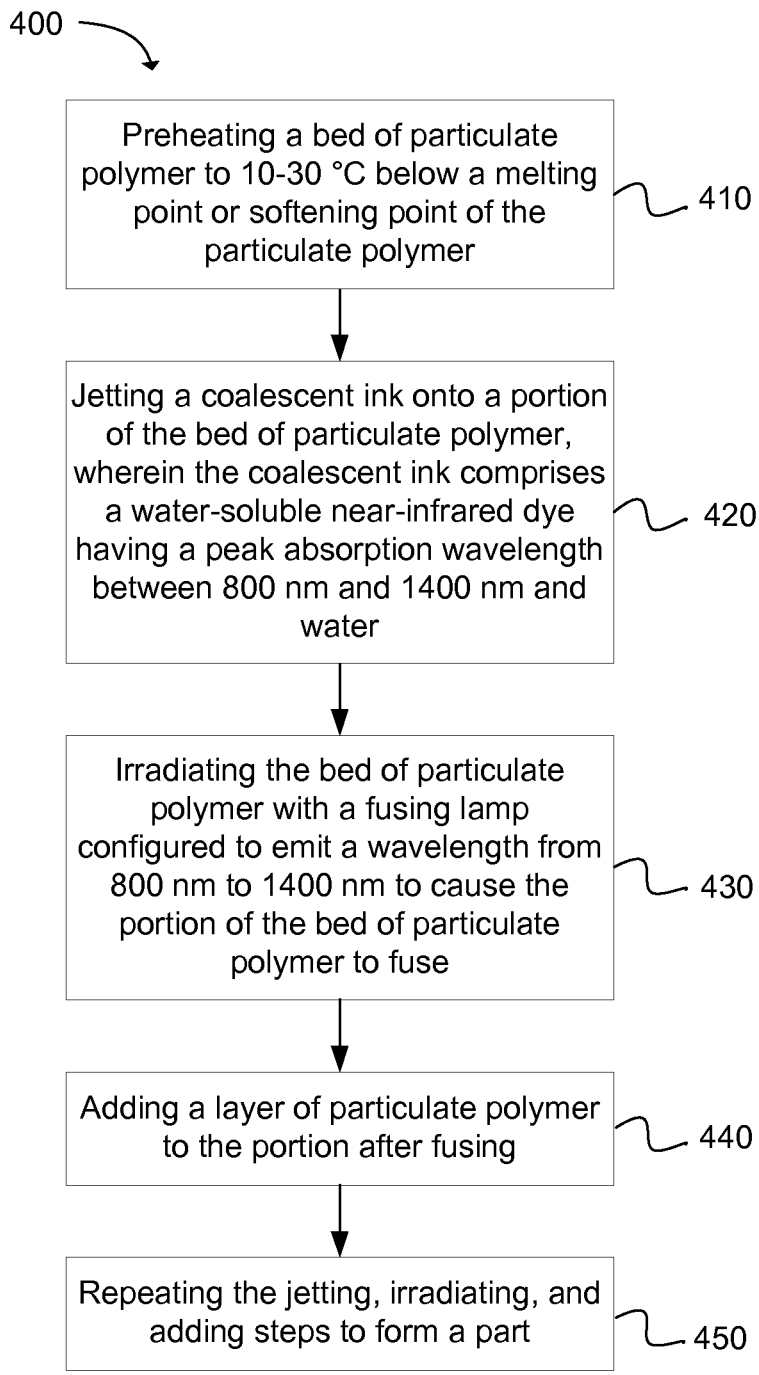
FIG. 4 is a flowchart illustrating a method for forming a 3D printed part in accordance with examples of the present disclosure.

FIG. 4 is a flowchart of a method 400 for forming a 3D printed part. The method includes preheating a bed of particulate polymer to about 10° C. to about 30° C. below a melting point or softening point of the particulate polymer 410; jetting a coalescent ink onto a portion of the bed of particulate polymer, wherein the coalescent ink comprises a water-soluble near-infrared dye having a peak absorption wavelength between 800 nm and 1400 nm and water 420; irradiating the bed of particulate polymer with a fusing lamp configured to emit a wavelength from 800 nm to 1400 nm to cause the portion of the bed of particulate polymer to fuse 430; adding a layer of particulate polymer to the portion after fusing 440; and repeating the jetting, irradiating, and adding steps to form a part 450.

In one example, the bed of particulate polymer can be formed by introducing polymer powder from a polymer powder supply and rolling the powder in a thin layer using a roller. The coalescent ink can be jetted using a conventional ink jet print head, such as a thermal ink jet (TIJ) printing system. The amount of coalescent ink printed can be calibrated based on the concentration of near-infrared dye in the ink, the temperature boosting capacity of the near-infrared dye, among other factors. The amount of coalescent dye printed can be sufficient to contact near-infrared dye with the entire layer of polymer powder. For example, if each layer of polymer powder is 100 microns thick, then the coalescent ink can penetrate at least 100 microns into the polymer powder. Thus the near-infrared dye can heat the polymer powder throughout the entire layer so that the layer can coalesce and bond to the layer below. After forming a solid layer, a new layer of loose powder can be formed, either by lowering the powder bed or by raised the height of the roller and rolling a new layer of powder.

The entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be nylon 12 powder. In another example, the preheat temperature can be about 90° C. to about 100° C. and the polymer powder can be thermoplastic polyurethane. Preheating can be accomplished with one or more lamps, an oven, a heated support bed, or other types of heaters. In some examples, the entire powder bed can be heated to a substantially uniform temperature.

The powder bed can be irradiated with a fusing lamp configured to emit a wavelength from 800 nm to 1400 nm. Suitable fusing lamps can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with near-infrared absorbing dyes while leaving the unprinted portions of the polymer powder below the melting or softening point.

In one example, the fusing lamp can be matched with the near-infrared dye so that the fusing lamp emits wavelengths of light that match the highest absorption wavelengths of the dye. A dye with a narrow peak at a particular near-infrared wavelength can be used with a fusing lamp that emits a narrow range of wavelengths at approximately the peak wavelength of the dye. Similarly, a dye that absorbs a broad range of near-infrared wavelengths can be used with a fusing lamp that emits a broad range of wavelengths. Matching the dye and the fusing lamp in this way can increase the efficiency of coalescing the polymer particles with the dye printed thereon, while the unprinted polymer particles do not absorb as much light and remain at a lower temperature.

Depending on the amount of near-infrared dye present in the polymer powder, the absorbance of the near-infrared dye, the preheat temperature, and the melting or softening point of the polymer, an appropriate amount of irradiation can be supplied from the fusing lamp. In some examples, the fusing lamp can irradiate each layer from about 0.5 to about 10 seconds.

In some cases, modifying inks can be used to address thermal bleed so as to improve the surface quality of the final printed part. The modifying inks can include materials having low thermal conductivity such as potassium iodide, sodium iodide or potassium sulfate. The modifying inks can be printed at boundaries between coalescing portions and non-coalescing portions, to slow heat dissipation from the coalescing portions to neighboring polymer particles. This can improve separation between the fused and unfused areas of the powder bed.

It is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle" or "ink vehicle" refers to a liquid fluid in which colorant is placed to form an ink. A wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants and/or water-soluble near-infrared dyes, the liquid vehicle can carry solid additives such as polymers, latexes, UV curable materials, plasticizers, salts, etc.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum. Additionally, "near-infrared dye" refers to a dye that absorbs primarily in the near-infrared region of the spectrum, i.e., about 800 nm to about 1400 nm.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "soluble," when referring to a dye, refers to the dye having a solubility percentage of more than 5 wt %.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

EXAMPLES

The following illustrates several examples of the present disclosure. However, it is to be understood that the following are only illustrative of the application of the principles of the present disclosure. Numerous modifications and alternative compositions, methods, and systems may be devised without departing from the spirit and scope of the present disclosure. The appended claims are intended to cover such modifications and arrangements.

Example 1

A tertiary amine-based water soluble near-infrared dye (FHI 98811S from Fabricolor Holding International) and two tetraphenyldiamine-based water soluble near-infrared dyes (FHI 994312S and FHI 104422P from Fabricolor Holding International) were obtained. The absorption spectra of these dyes in water are illustrated in FIGS. 1-3. The dyes have absorptions within the range of 800 to 1400 nm and which fall within the emissive spectrum of an infrared lamp used in the LAP process. The infrared lamp emits radiation corresponding to blackbody radiation at a temperature of 2200° C. The infrared lamp has a $\lambda_{max}$ wavelength of about 1100 nm and quickly forms a tail end at higher wavelengths. Dyes with a similar absorption range can efficiently convert energy from the infrared lamp into thermal energy. Of the tested dyes, the absorption range of FHI 104422P matches the range of the infrared lamp most closely. Initial experiments were carried out by making ink dispersions with FHI 104422P. First, aqueous solutions of the dye were made with two different concentrations of dye. Then an ink vehicle consisting of components such as 2-pyrrolidinone, 2-methyl-1,3-propanediol, tetraethylene glycol, liponic ester, surfynol CT151, Zonyl FSO and tris base was prepared. The ink vehicle was mixed with the aqueous dye solutions so that the ink vehicle was present in an amount of 30 wt % in each of the final ink solutions. The overall content of dye in the final ink solutions was 1 wt % in the first ink solution and 2.5 wt % in the second ink solution. For each ink, a 100 micron layer of thermoplastic polyurethane (TPU) powder was heated to 90° C. and then the ink was printed to form a shape. The powder was then exposed to the infrared lamp. This raised the temperature, causing the printed TPU particles to fuse. Another layer of 100 micron thickness of TPU powder was coated over the bed and the process was repeated to obtain the final part. The final part was retrieved from the build bed and cleaned by mild sand blasting. The final part obtained with 1 wt % dye in the ink adopts the natural color of the TPU. When the dye concentration is increased to 2.5 wt %, the color is slightly darker. Both parts had good color consistency. Increasing the concentration of dye to 2.5 wt % in the ink increases the fusing efficiency of the TPU particles but also darkens the final color slightly. Further optimization can yield good mechanical properties. Post annealing of the part can also increase the mechanical properties without altering the accuracy of the part. The same process was repeated with FHI 98811S and FHI 994312S. The ink prepared with FHI 98811S had printability issues with kogation whereas FHI 994312S yielded similar results to FHI 104422P.

Example 2

FHI 104422P (0.75 g) was dissolved in water (51.75 g). An ink vehicle was prepared according to the ratio of chemicals in Table 6. In addition, additives such as Crodafos, PEI, glycerol or glycolic acid esters and ethers and or SDS surfactant can be added. This ink vehicle (22.5 g) is added to the above dye solution to make an ink containing 1 wt % of the near-infrared dye. A similar process is followed to make ink with 2.5 wt % of the dye in the ink. The mechanical properties of the final part can be further adjusted by post annealing the sample to 150° C. and cooling to ambient temperature.

TABLE 6

| Ink Components | Wt % |
|---|---|
| 2-Pyrrolidinone | 75 |
| 2-Methyl-1,3-Propanediol | 7 |
| Tetraethylene glycol | 7 |
| LEG-1 | 6.36 |
| Surfynol ® CT151 surfactant from Air Products and Chemicals, Inc. | 0.99 |
| Zonyl ® FSO fluorosurfactant from DuPont | 0.09 |
| SMA1440H | 3.11 |
| Tris base | 0.45 |

Example 3

Example 2 is repeated under similar conditions except using the ink vehicle (22.5 g) from Table 7.

TABLE 7

| Ink Components | Wt % |
|---|---|
| 2-Pyrrolidinone | 98.7 |
| Crodafos N3 ™ surfactant from Croda | 1.6 |

Example 4

Example 2 is repeated under similar conditions except using the ink vehicle (22.5 g) from Table 8.

TABLE 8

| Ink Components | Wt % |
|---|---|
| 2-methyl-1,3-propanediol | 95.9 |
| Crodafos N3 ™ surfactant from Croda | 1.3 |
| Tergitol ™ 15-S-12 surfactant from Dow Chemical Company | 1.3 |
| Zonyl ® FSO-100 fluorosurfactant from DuPont | 1 |
| Proxel ™ GXL (20% as is) biocide from Lonza | 0.5 |

Example 5

Example 2 is repeated under similar conditions except using the ink vehicle (22.5 g) from Table 9.

TABLE 9

| Ink Components | Wt % |
|---|---|
| 2-Hydroxyethyl-2-Pyrrolidone | 20.3 |
| Dantocol ™ DHE bonding agent from Lonza | 67.7 |
| LEG | 2.0 |
| Crodafos N3 ™ surfactant from Croda | 2.0 |
| Surfynol ® SEF surfactant from Air Products and Chemicals, Inc. | 6.8 |
| Kordek ™ MLX biocide from Dow Chemical Company | 0.6 |
| Proxel ™ GXL biocide from Lonza | 0.6 |

Example 6

Example 2 is repeated under similar conditions except using the ink vehicle (22.5 g) from Table 10.

TABLE 10

| Ink components | Wt % |
|---|---|
| Tripropylene glycol | 52.5 |
| 1-(2-Hydroxyethyl)-2-imidazolidinone | 40 |
| LEG-1 | 2 |
| Crodafos N3 ™ surfactant from Croda | 2 |
| Tergitol ™ 15-S-7 surfactant from Dow Chemical Company | 2 |
| Zonyl ® FSO fluorosurfactant from DuPont | 1 |
| Proxel ™ GXL biocide from Lonza | 0.5 |

Example 7

TPU powder was heated to 90° C. in a test bed. Then the ink is printed in the desired location to make a test shape. Uniform temperature is maintained in the test bed. The infrared lamp is then swept across the entire test bed area to fuse the particles in the ink printed area. An additional layer of powder is next spread on the test bed and the process continued to form a complete test part. The part is taken out of the powder bed and mildly sand blasted. Tests part prepared using inks with 1 wt % dye are nearly colorless. Test parts prepared using inks with 2.5 wt % dye have a light green color. Each test part has the characteristic flexibility of polyurethane. Each test part also has good color uniformity.

Example 8

An ink is prepared by the same method as in Example 2, but with FHI 994312S dye instead of FHI 104422P. The same printing process described in Example 7 is used to form test parts and similar results are obtained.

Example 9

The inks of Examples 2 to 6 are prepared to have a specific desired color by adding a colorant to the inks (in addition to the near-infrared dye, which is essentially colorless or imparts only a pale color). In this example, to each of these inks, 1 wt %, 2 wt %, 3.5 wt %, 5 wt %, or 7 wt % of any one of a cyan, magenta, yellow, or black pigment (self dispersed or dispersant dispersed) is added to the inks by replacing an equivalent amount of one or more of the major solvents, e.g., water, 2-pyrrolidinone, 2-methyl-1,3-propanediol, 2-hydroxyethyl-2-pyrrolidinone, etc., or an equivalent amount of the liquid vehicle as a whole.

What is claimed is:

1. A coalescent ink for 3-dimensional printing, comprising:
a water-soluble near-infrared dye having a peak absorption wavelength from 800 nm to 1400 nm, wherein the near-infrared dye is selected from the group consisting of aminium dyes, tetraaryldiamine dyes, cyanine dyes, dithiolene dyes, and combinations thereof;
a colorant imparting a visible color to the coalescent ink; and
water,
wherein the coalescent ink does not include a polymeric binder.

2. The coalescent ink of claim 1, wherein the near-infrared dye does not substantially alter the visible color of the coalescent ink.

3. The coalescent ink of claim 1, wherein the near-infrared dye has a temperature boosting capacity of about 10° C. to about 30° C. for a polymer with a melting point of about 100° C. to about 350° C.

4. The coalescent ink of claim 1, further wherein the colorant is a pigment.

5. The coalescent ink of claim 1, wherein the near-infrared dye has a concentration of 0.1 wt % to 25 wt % in the coalescent ink.

6. The coalescent ink of claim 1, wherein the colorant has a concentration of 0.5 wt % to 10 wt % in the coalescent ink.

7. The coalescent ink of claim 1, wherein the coalescent ink imparts a visible color when jetted onto polymer particles and provides a concentration of near-infrared dye of 0.1 wt % to 1.5 wt % with respect to the polymer particles.

8. The coalescent ink of claim 1, wherein the coalescent ink consists of:
   the near-infrared dye;
   the colorant; and
   a liquid vehicle, wherein the liquid vehicle comprises the water.

9. A material set for 3-dimensional powder bed printing, comprising:
   a coalescent ink comprising water, a colorant imparting a visible color to the coalescent ink and a water-soluble near-infrared dye having a peak absorption wavelength from 800 nm to 1400 nm; and
   a particulate polymer formulated to coalesce when contacted by the coalescent ink and irradiated by a near-infrared energy emitting the peak absorption wavelength.

10. The material set of claim 9, wherein the near-infrared dye is selected from the group consisting of aminium dyes, tetraaryldiamine dyes, cyanine dyes, dithiolene dyes, and combinations thereof.

11. The material set of claim 9, wherein the colorant is a pigment.

12. The material set of claim 9, wherein the particulate polymer is selected from the group consisting of nylon 6 powder, nylon 9 powder, nylon 11 powder, nylon 12 powder, nylon 66 powder, nylon 612 powder, polyethylene powder, thermoplastic polyurethane powder, polypropylene powder, polyester powder, polycarbonate powder, polyether ketone powder, polyacrylate powder, polystyrene powder, and mixtures thereof.

13. The material set of claim 9, wherein the particulate polymer has a melting or softening point from about 100° C. to about 350° C.

14. The material set of claim 9, wherein the near-infrared dye, when printed on a portion of the particulate polymer, has a sufficient temperature boosting capacity so that the printed portion of the particulate polymer increases in temperature by at least 10° C. more than a non-printed portion of particulate polymer when both the printed portion and the non-printed portion are irradiated with a wavelength of about 800 nm to about 1400 nm.

15. The material set of claim 9, wherein the coalescent ink does not include a polymeric binder.

* * * * *